United States Patent [19]

Ngo et al.

[11] Patent Number: 5,764,436
[45] Date of Patent: Jun. 9, 1998

US005764436A

[54] FIXED CRASH STOP

[75] Inventors: Long Van Ngo, San Jose; Narayanaswamy Pasupathy, Sunnyvale, both of Calif.; Choon Kiat Lim, Singapore, Singapore; Mike James Darling, Soquel, Calif.

[73] Assignee: Seagate Technology, Inc., Scotts Valley, Calif.

[21] Appl. No.: 811,113

[22] Filed: Mar. 3, 1997

[51] Int. Cl.⁶ .................. G11B 5/54; G11B 21/22
[52] U.S. Cl. .................................................. 360/105
[58] Field of Search .................. 360/97.01, 98.01, 360/105, 106

[56] References Cited

U.S. PATENT DOCUMENTS

| | | | |
|---|---|---|---|
| 5,339,209 | 8/1994 | Dion | 360/105 |
| 5,402,290 | 3/1995 | Daniel | 360/106 |
| 5,404,257 | 4/1995 | Alt | 360/105 |
| 5,452,159 | 9/1995 | Stefansky | 360/105 |
| 5,455,728 | 10/1995 | Edwards et al. | 360/105 |
| 5,663,855 | 9/1997 | Kim et al. | 360/105 |

FOREIGN PATENT DOCUMENTS

| | | | |
|---|---|---|---|
| 1-253878 | 10/1989 | Japan | 360/105 |
| WO 90/05360 | 5/1990 | WIPO | 360/105 |

*Primary Examiner*—Jefferson Evans
*Attorney, Agent, or Firm*—LaRiviere, Grubman & Payne

[57] ABSTRACT

A hard disk drive assembly having a pivoted arm that moves a read/write head over a hard disk from an inside diameter to an outside diameter, and an unadjustable, one-piece crash stop that limits the movement of the arm. A first version of the crash stop is an elongated member having a smooth bottom free of projections, and having first and second through holes. The hard disk drive assembly has a base having two threaded holes. The first and second through holes of the crash stop align with the two threaded holes when the crash stop is placed on the base. Screws are disposed in the first and second through holes and are threadably engaged with the two threaded holes in the base. The screws, when tightened, lock the crash stop in a precise location. In this version, one of the screws passes through a very closely-fitting precision round hole in the one-piece crash stop. That screw acts, in effect, like a locating pin. This version can be used without modifying the existing base of the hard disk drive assembly. In a second version of the invention, the fixed crash stop employs only a single mounting screw and two precision locating pins along with a modified base. One of the pins has a close fit in its locating hole. This locating pin ensures that the improved crash stop is correctly and accurately located.

2 Claims, 4 Drawing Sheets

FIXED CRASH STOP

FIELD OF THE INVENTION

The present invention relates to a crash stop for a hard disk drive and, more particularly, to an improved crash stop that is easier to install and that saves money in parts, materials, fixtures and in process labor to install and adjust the crash stop.

BACKGROUND OF THE INVENTION

A hard disk drive assembly is provided with an arm that has a read/write head at one end and a voice coil motor (VCM) actuator at the other end. The VCM actuator moves the arm so that the read/write head travels over a plurality of tracks extending concentrically on a recording disk from an inside diameter (ID) to an outside diameter (OD). A crash stop assembly is provided in the hard disk drive assembly to prevent the arm from going beyond the ID or the OD on the disk.

A typical prior art crash stop assembly includes two housing limit stops, one located to prevent the arm from traveling beyond the ID, and one located to prevent the arm from traveling beyond the OD. The two housing limit stops are located at the VCM end of the arm. A striker plate is bonded to the arm. Two screws and flat washers are used to fasten the housing limit stops to threaded holes provided in a base casting of the hard disk assembly. Through holes in the housing limit stops are not round, but are elongated so that position adjustments may be made. A precision adjustment setting fixture is used to set the location of the two housing limit stops.

Although the prior art crash stop assembly is entirely satisfactory and continues to be manufactured and used, it is costly due to material and process labor. It requires two housing limit stops, a striker plate, two screws, two flat washers and a plurality of adjustment fixtures for a family of drives that can cost $200,000.00 for ten units of equipment. In addition there is the labor cost of assembly and adjustment of the crash stop.

Accordingly, there is a need for a crash stop arrangement that uses fewer parts, that is less costly in parts and in labor, and which does not require the use of a precision crash stop locating and adjustment fixture.

DISCLOSURE OF INVENTION

In accordance with the foregoing and other features, there is provided an improved one-piece, fixed crash stop for hard disk drive assemblies. A first version of the one-piece, fixed crash stop in accordance with the present invention uses two mounting screws and the existing base casting. In this version, one of the screws passes through a very closely-fitting precision round hole in the one-piece crash stop. That screw acts, in effect, like a locating pin.

A second version of the one-piece, fixed crash stop in accordance with the present invention employs only a single mounting screw and two precision locating pins along with a modified base. One of the pins has a diameter of 0.0900±0.0005 inches, and it fits in a locating hole having a diameter of 0.091+0.001,−0.000. This locating pin ensures that the improved crash stop is correctly and accurately located.

Other features of the present invention are disclosed or apparent in the section entitled "BEST MODE FOR CARRYING OUT THE INVENTION."

BRIEF DESCRIPTION OF THE DRAWING

For a fuller understanding of the present invention, reference is made to the accompanying drawing taken in conjunction with the following detailed description of the Best Mode For Carrying Out The Invention. In the drawing.

Reference numbers refer to the same or equivalent parts of the present invention throughout the figure.

BEST MODE FOR CARRYING OUT THE INVENTION

Hard disk drives, disk surfaces, servo control systems, VCM actuators, crash stops, and read/write heads are all known in the art, and in order to avoid confusion while enabling those skilled in the art to practice the claimed invention, this specification omits many details with respect to those items.

Figure 1:
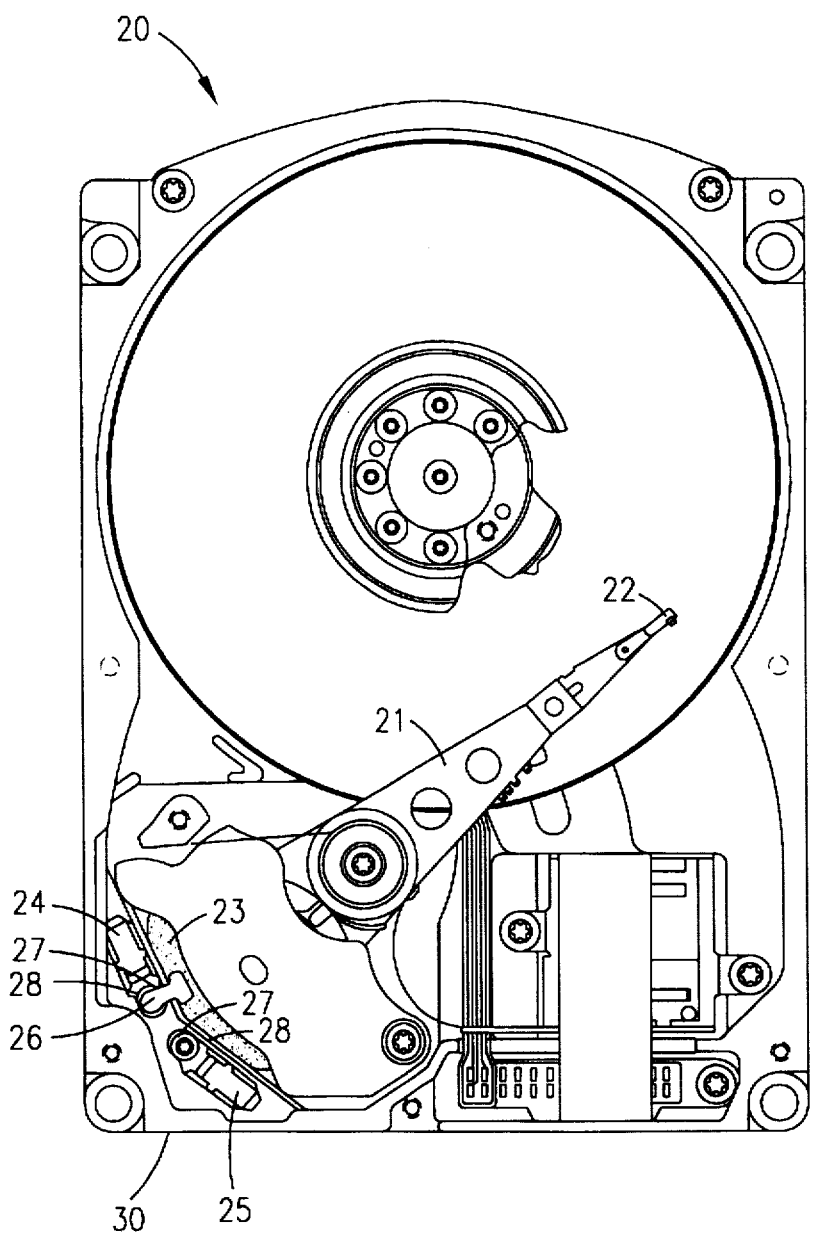
FIG. 1 is a top plan view of a hard disk drive assembly that includes a prior art two-piece, adjustable, crash stop assembly.

Referring now to FIG. 1, there is shown a top plan view of a hard disk drive assembly 20 that includes an arm 21 having a read/write head at a first end 22, and a voice coil motor (VCM) at a second end 23. The hard disk drive assembly 20 shown in FIG. 1 employs a prior art two-piece, adjustable, crash stop assembly.

The crash stop assembly comprises a first housing limit stop 24, a second housing limit stop 25, a striker plate 26, two 2–56 screws 27, two flat washers 28, and a base 30 having threaded holes for the screws 27. The first and second housing limit stops 24, 25 are provided with through holes for passing the screws 27. Thus, the screws 27 secure the limit stops 24, 25 to the threaded holes in the base 30. The holes in the limit stops 24, 25 are not round but are elongated so that the limit stops 24, 25 can be adjusted back and forth before the screws 27 are tightened down. The striker plate 26 is bonded to the second end 23 of the arm 21. In operation, after the limit stops 24, 25 are properly adjusted and fastened firmly to the base 30, the arm 21 may be rotated in either direction by the VCM around a pivot so that the arm 21 swings until the striker plate 26 comes in contact with one of the housing limit stops 24, 25.

This prior art crash stop arrangement is quite satisfactory, and continues to be widely manufactured and used. However, typically the adjustment of the limit stops 24, 25 is made on the assembly line using a costly precision crash stop setting fixture. These precision setting fixtures have an initial cost of approximately $50,000.00. For a given family of hard disk drives such as the Seagate ST-3XXX family of drives, an investment of $200,000.00 in crash stop setting fixtures is required. Also, the prior art crash stop arrangement is costly due to the number of parts involved and the labor involved in assembling the parts and making the precision adjustments.

Figure 2:
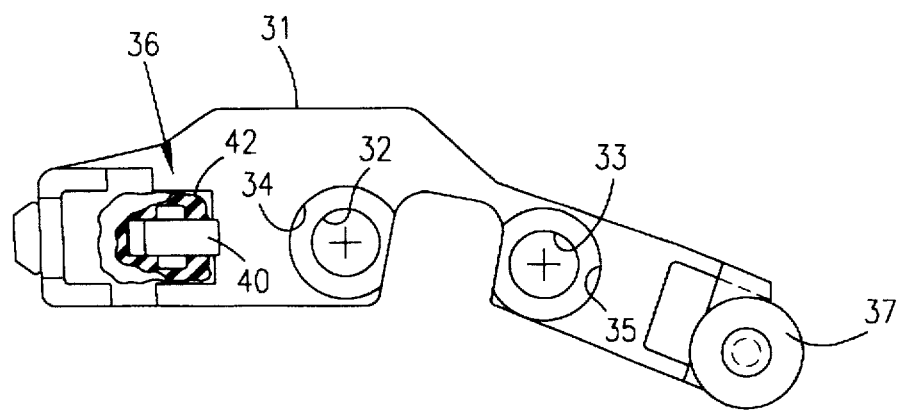
FIG. 2 is a top plan view of a first version of a one-piece fixed crash stop in accordance with the present invention.
Figure 3:
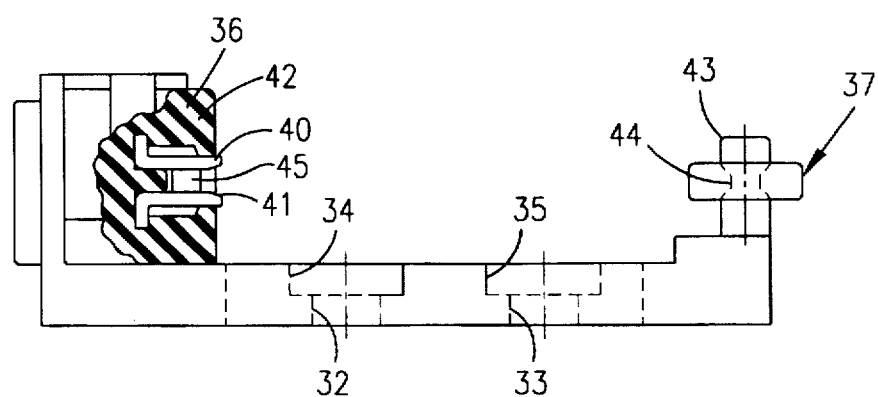
FIG. 3 is a side elevation view of the one-piece fixed crash stop shown in FIG. 2.

Referring now to FIGS. 2 and 3, FIG. 2 is a top plan view of a first version of a one-piece fixed crash stop 31 in accordance with the present invention, while FIG. 3 is a side elevation view thereof. The crash stop 31 is made by injection molding a plastic material such as the material known as ICI "VICTREX" Peek 4506. The bottom of the crash stop 31 is perfectly smooth and has no projections. The crash stop 31 is provided with first and second through holes 32, 33. The first through hole 32 is 0.087±0.0005 inches in diameter, while the second through hole 33 is 0.102±0.001 inches in diameter. These holes 32, 33 are round and register with the position of the threaded holes in the already existing base 30 shown in FIG. 1. Two screws 27 as used in FIG. 1 pass through the holes 32, 33 and mount the crash stop 31 to the base 30. The screw 27 through the first hole 32 acts as an alignment pin because of the close tolerance of the first hole 32. The first and second through holes 32, 33 are each provided with counterbores 34, 35 for receiving the screw heads and the flat washers 28.

The crash stop 31 is provided with a latch 36 and an O-ring 37. The latch 36 is mounted on the ID side, and comprises metal pole pieces 40, 41 sandwiching a permanent magnet 45 and embedded in a block 42 made of an elastomeric material such as rubber, or the like. The O-ring 37 is mounted on a vertical post 43 on the OD side to dampen ringing or vibration. The post is provided with a neck 44 to receive the O-ring 37.

This first version of the crash stop 31 in accordance with the present invention is an improvement over the prior art two-piece, adjustable, crash stop assembly shown in FIG. 1. The improved crash stop 31 is not adjustable, and does not require adjustment using an expensive precision adjustment fixture. The crash stop 31 does not require much assembly time and requires no adjustment time. The crash stop 31 is made of one piece rather than two. Thus, the improved crash stop 31 is easier to install, requires no adjustment fixture, has fewer parts, costs less than the two-piece crash stop assembly of FIG. 1, and uses the same base 30 without modification.

The first version of the crash stop 31 in accordance with the present invention is not as precise as the two-piece crash stop assembly it replaces. It should be understood that a one-mil error at the VCM end 23 of the arm 21 can result in a two-mil error at the read/write head end 22 because of the lever arm effect. An error of two-mils at the head end 22 could be an error of ten tracks, or so on the hard disk.

Figure 4:
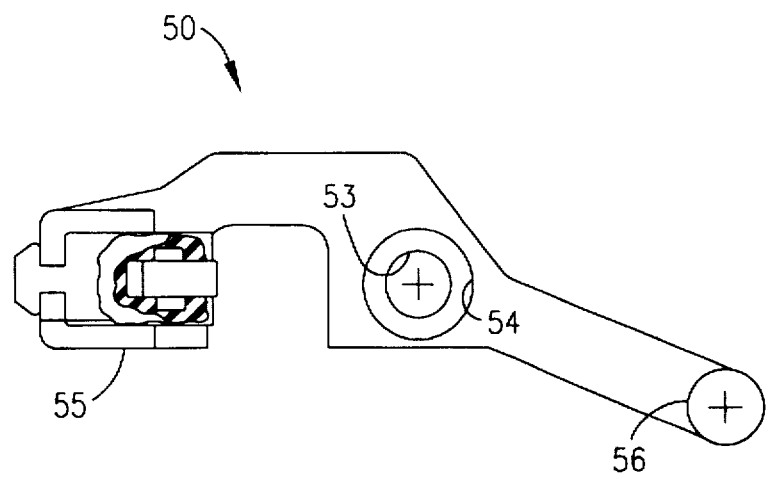
FIG. 4 is a top plan view of a second version of a one-piece fixed crash stop in accordance with the present invention.
Figure 5:
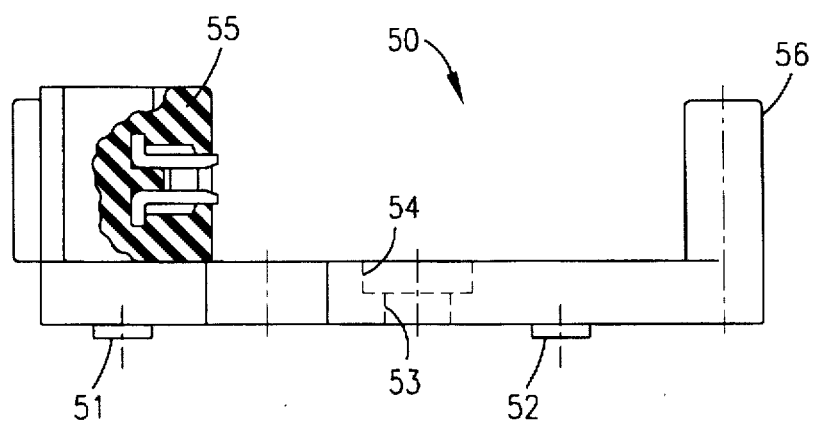
FIG. 5 is a side elevation view of the one-piece fixed crash stop shown in FIG. 4.

Referring now to FIGS. 4 and 5, FIG. 4 is a top plan view of a second version of a one-piece fixed crash stop 50 in accordance with the present invention, while FIG. 5 is a side elevation view thereof. The bottom of this crash stop 50 does have projections. Referring to FIG. 5, there are provided first and second locating pins 51, 52. The first pin 51 has a diameter of 0.0900±0.0005 inches, while the second pin 52 has a diameter of 0.090±0.001 inches. Only one through hole 53 is provided, along with a concentric counterbore 54. The diameter of the hole 53 is 0.098±0.001 inches. The second crash stop 50 in accordance with the invention is also provided with a latch 55 and a post 56.

Figure 6:
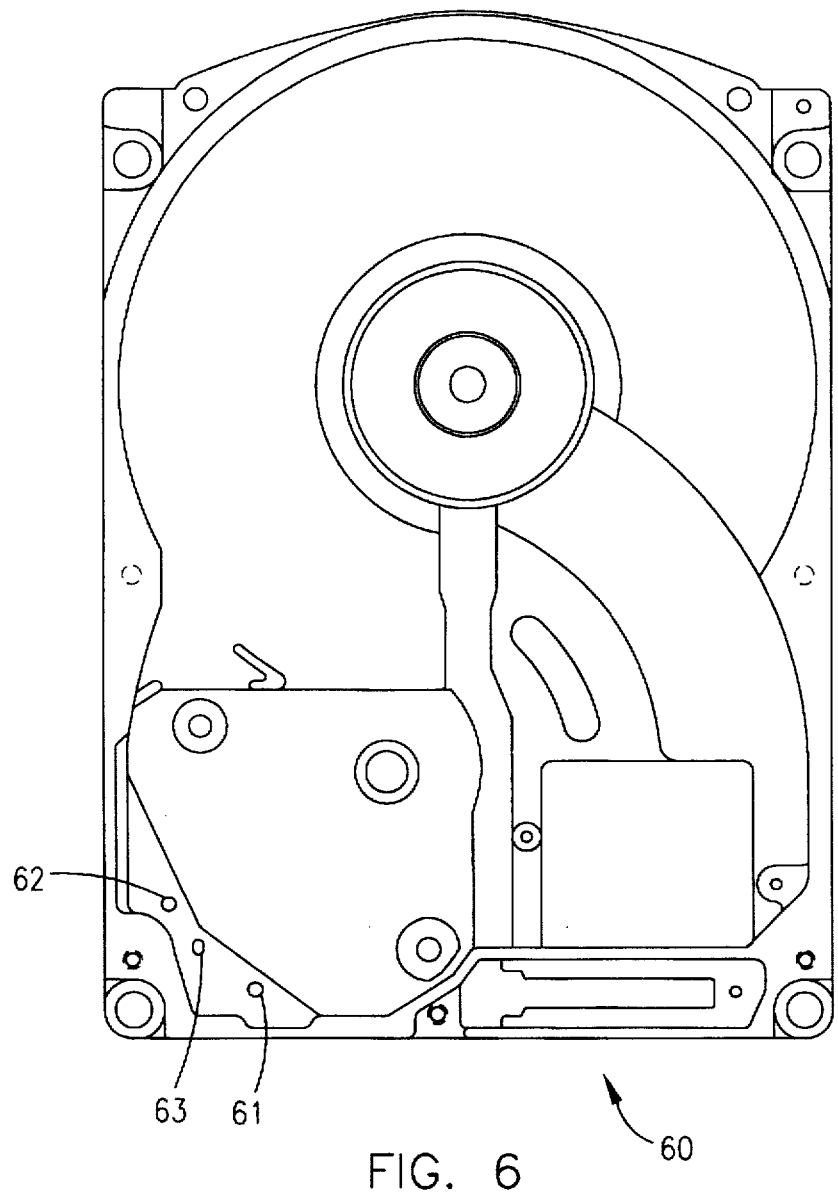
FIG. 6 is a top plan view of a modified base for use with the second version of a one-piece fixed crash stop in accordance with the present invention shown in FIGS. 4 and 5.

Referring now to FIG. 6, there is shown a top plan view of a modified base 60 for use with the second version of a one-piece fixed crash stop 50 in accordance with the present invention shown in FIGS. 4 and 5. The base 60 is provided with first and second precision locating holes 61, 62. Hole 61 has a diameter of 0.091+0.001,−0.000, and hole 62 has a diameter of 0.108±0.002. The base 60 is provided with a through hole 63 having a 2–56 internal thread. When mounting the crash stop 50 to the base 60, the locating pins 51, 52 are inserted into the locating holes 61, 62, and a screw 27 is tightened into the threaded hole 63. The head of the screw 27 and a flat washer 28 are received into the counterbore 54.

The first locating pin 52 with its diameter of 0.0900±0.0005 inches, inserted into the first locating hole 61 with its diameter of 0.091+0.001,−0.000 controls the accuracy of the positioning of the crash stop 50. Clearly, this is an improvement over the first version of a crash stop 31 shown in FIGS. 2 and 3, and the accuracy compares favorably with the two-piece adjustable crash stop assembly shown in FIG. 1.

A series of tests were made comparing the performance of the one-piece crash stop of FIGS. 4 and 5 with the performance of the two-piece crash stop of FIG. 1. The head velocity, acceleration and displacement (compression of crash stop) when the arm velocity was 80 inches per second, were measured. This simulates a runaway condition of the arm when control on the disk drive is lost. Table I shows the data for the two-piece crash stop of FIG. 1 taken when the striker plate impacts the crash stop at the outside diameter (OD) of the disk. Table II shows the data for the two-piece crash stop of FIG. 1 when the striker plate impacts the crash stop at the inside diameter (ID) of the disk. Tables III and IV give the corresponding data for the one-piece crash stop of FIGS. 4 and 5. The data shows that the performance of the one-piece crash stop of FIGS. 4 and 5 is comparable to the performance of the two-piece crash stop of FIG. 1.

TABLE I

| OD, TWO-PIECE CRASH STOP | | | |
|---|---|---|---|
| Sample | Gap Velocity (ips) | Gap Acceleration (g) | Compression at Gap (mil) |
| 1 | 86.4 | 964.2 | 20.2 |
| 2 | 86.5 | 1000.3 | 18.6 |
| 3 | 88.3 | 972.9 | 21.1 |
| Avg. | 87.1 | 979.1 | 20 |
| 3 sigma range | — | 922.6–1035.7 | 16.2–23.8 |

TABLE II

| ID, TWO-PIECE CRASH STOP | | | |
|---|---|---|---|
| Sample | Gap Velocity (ips) | Gap Acceleration (g) | Compression at Gap (mil) |
| 1 | 84.3 | 767.3 | 28 |
| 2 | 83.3 | 738.8 | 26.9 |
| 3 | 83.9 | 713.4 | 27.8 |
| Avg. | 83.8 | 739.8 | 27.6 |
| 3 sigma range | — | 658.9–820.7 | 25.8–29.3 |

TABLE III

| OD, ONE-PIECE CRASH STOP | | | |
|---|---|---|---|
| Sample | Gap Velocity (ips) | Gap Acceleration (g) | Compression at Gap (mil) |
| 1 | 81.1 | 666.3 | 24.2 |
| 2 | 83.6 | 696 | 24.1 |
| 3 | 83.7 | 695.3 | 25.6 |
| 4 | 81.2 | 719.3 | 26 |
| Avg. | 82.4 | 694.2 | 25 |
| 3 sigma range | — | 629.1–759.3 | 22.1–27.9 |

TABLE IV

ID, ONE-PIECE CRASH STOP

| Sample | Gap Velocity (ips) | Gap Acceleration (g) | Compression at Gap (mil) |
| --- | --- | --- | --- |
| 1 | 83.5 | 881 | 25.5 |
| 2 | 83.9 | 841.6 | 24.7 |
| 3 | 83.8 | 848.2 | 24.7 |
| 4 | 83.6 | 815.3 | 26.1 |
| Avg. | 83.7 | 846.5 | 25.3 |
| 3 sigma range | — | 776.3–916.7 | 23.5–27 |

The present invention has been particularly shown and described with respect to preferred versions and features thereof. However, it should be readily apparent to those of ordinary skill in the art that various changes and modifications in form and detail may be made without departing from the spirit and scope of the invention as set forth in the appended claims. The invention illustratively disclosed herein may be practiced without any element which is not specifically disclosed herein.

What is claimed is:

1. A fixed crash stop for a hard disk drive assembly, the hard disk drive assembly having a pivoted arm that is rotatable by a voice coil motor to move a read/write head over a hard disk from an inside diameter to an outside diameter, the fixed crash stop comprising:

an elongated member having a smooth bottom free of projections, and having first and second through holes, said first through hole having a diameter of 0.087±0.0005 inches, said second through hole having a diameter of 0.102±0.001 inches, said first and second through holes each provided with a counterbore;

a vertical post disposed at one end of said elongated member, said post being provided with a reduced diameter neck near the distal end thereof;

an O-ring disposed on said post and located in a depression formed by said reduced diameter neck;

a latch mounted at the other end of said elongated member, said latch including metal pole pieces sandwiching a permanent magnet and embedded in a block of elastomeric material;

a base provided with two threaded holes, said first and second through holes aligning with said two threaded holes when said elongated member is placed on said base;

a pair of flat washers, one being disposed in each of the counterbores of said first and second through holes; and a pair of screws, one being disposed in each of said first and second through holes and being threadably engaged with each of said two threaded holes in said base, said screws when tightened locking said elongated member in a precise location to act as fixed crash stop for the pivoted arm that is rotatable by a voice coil motor to move a read/write head over a hard disk from an inside diameter to an outside diameter, the pivoted arm pivoting from said latch on the inside diameter to said O-ring on the outside diameter.

2. A fixed crash stop for a hard disk drive assembly, the hard disk drive assembly having a pivoted arm that is rotatable by a voice coil motor to move a read/write head over a hard disk from an inside diameter to an outside diameter, the fixed crash stop comprising:

an elongated member having a single through hole, said through hole having a diameter of 0.098±0.001 inches, said through hole having a counterbore;

first and second locating pins disposed on the bottom of said elongated member, said first locating pin having a diameter of 0.0900±0.0005 inches, said second through hole having a diameter of 0.090±0.001 inches;

a vertical post disposed at one end of said elongated member;

a latch mounted at the other end of said elongated member, said latch including metal pole pieces sandwiching a permanent magnet and embedded in a block of elastomeric material;

a base provided with one threaded hole and two precision locating holes, said through hole aligning with said threaded hole when said elongated member is placed on said base, said first and second locating pins aligning with said two precision locating holes when said elongated member is placed on said base, said first locating aligning with the said precision locating hole having a diameter of 0.091±,+0.001−0.000;

a flat washer disposed in the counterbores of said through hole; and a screw disposed in said through hole and threadably engaged with said threaded hole in said base, said screw when tightened locking said elongated member in a precise location to act as fixed crash stop for the pivoted arm that is rotatable by a voice coil motor to move a read/write head over a hard disk from an inside diameter to an outside diameter, the pivoted arm pivoting from said latch on the inside diameter to said vertical post on the outside diameter.

\* \* \* \* \*